(12) United States Patent
Martinez et al.

(10) Patent No.: US 7,917,743 B2
(45) Date of Patent: Mar. 29, 2011

(54) SYSTEM AND METHOD FOR A REMOTE INFORMATION HANDLING SYSTEM BOOT

(75) Inventors: Ricardo L. Martinez, Austin, TX (US); Craig Lawrence Chaiken, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 710 days.

(21) Appl. No.: 11/939,659

(22) Filed: Nov. 14, 2007

(65) Prior Publication Data
US 2009/0125709 A1    May 14, 2009

(51) Int. Cl.
*G06F 9/00* (2006.01)
*G06F 9/24* (2006.01)
*G06F 1/24* (2006.01)
(52) U.S. Cl. .................. 713/2; 713/1; 713/100
(58) Field of Classification Search .................. 713/2
See application file for complete search history.

(56) References Cited

U.S. PATENT DOCUMENTS

| | | | |
|---|---|---|---|
| 5,870,520 A | | 2/1999 | Lee et al. |
| 5,872,968 A | * | 2/1999 | Knox et al. ............... 713/2 |
| 5,940,074 A | | 8/1999 | Britt, Jr. et al. |
| 6,223,284 B1 | | 4/2001 | Novoa et al. |
| 6,282,643 B1 | * | 8/2001 | Cromer et al. ............. 713/2 |
| 6,438,688 B1 | * | 8/2002 | Nunn ................... 713/2 |
| 6,715,074 B1 | | 3/2004 | Chaiken |
| 6,757,838 B1 | | 6/2004 | Chaiken et al. |
| 7,039,811 B2 | | 5/2006 | Ito |
| 7,233,559 B2 | | 6/2007 | Tanimukai et al. |
| 7,406,591 B2 | * | 7/2008 | Rothman et al. ........... 713/2 |
| 2006/0288202 A1 | * | 12/2006 | Doran et al. ............. 713/2 |

OTHER PUBLICATIONS

Intel, ASF: Standards-based Systems Management, Providing remote access and manageability in OS-absent environments, 2002, p. 1-p. 8, Intel Corporation.

* cited by examiner

*Primary Examiner* — Suresh K Suryawanshi
(74) *Attorney, Agent, or Firm* — Haynes and Boone, LLP

(57) ABSTRACT

In an information handling system (IHS), providing an IHS boot includes forcing the IHS to power on or reboot, retrieving a virtual serial peripheral interface (SPI) boot image using a virtual SPI bus, booting the IHS to the virtual SPI boot image, turning off the virtual SPI boot image, and updating a real SPI boot image.

20 Claims, 2 Drawing Sheets

SYSTEM AND METHOD FOR A REMOTE INFORMATION HANDLING SYSTEM BOOT

BACKGROUND

The present disclosure relates generally to information handling systems (IHSs), and more particularly to remotely booting the IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

When IHSs start-up they go through a boot process for starting-up and bringing to life the components of the IHS. Components of the IHS, such as memory, are initialized and scanned to check for defects. During the start-up of the IHS, an on-board basic input-output system (BIOS) performs the functions to initialize the components of the IHS so that the IHS may operate properly. However, if there is a problem with the BIOS (e.g., the BIOS image stored in memory is corrupted), the IHS may be unable to complete the boot process to operate properly. To repair such a problem with the BIOS, a technician may need to travel to the location of the IHS to perform maintenance on the system. This is costly and time intensive for both the technician and the IHS user. Additionally, there may be times when one might want to boot a custom system BIOS for some purpose, but does not want to incur the cost and risk of reprogramming the media storing the BIOS.

Accordingly, it would be desirable to provide an improved IHS boot, absent disadvantages, some of which are discussed above.

SUMMARY

According to one embodiment, an information handling system (IHS) boot includes providing an IHS boot by forcing the IHS to power on or reboot, retrieving a virtual serial peripheral interface (SPI) boot image using a virtual SPI bus, booting the IHS to the virtual SPI boot image, turning off the virtual SPI boot image, and updating a real SPI boot image.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
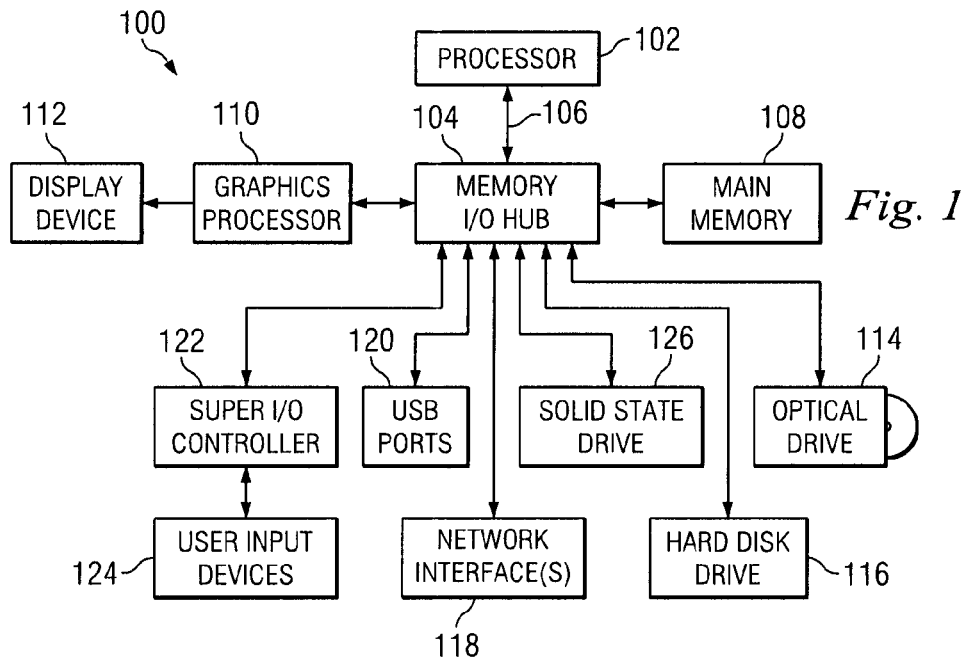
FIG. 1 illustrates a block diagram of an embodiment of an IHS.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces (NIC) 118, one or more Universal Serial Bus (USB) ports 120, and a super I/O controller 122 to provide access to user input devices 124, etc. The IHS 100 may also include a solid state drive (SSD) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
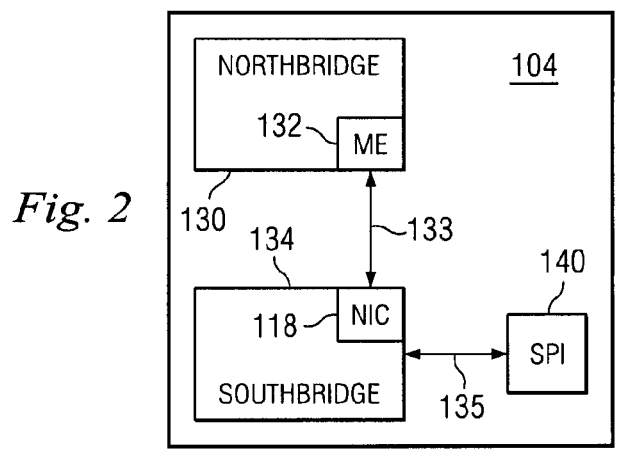
FIG. 2 illustrates a block diagram of an embodiment of a memory I/O hub.

FIG. 2 illustrates an embodiment of a memory I/O hub 104. In an embodiment, the memory I/O hub 104 comprises a Northbridge 130 with a management engine 132 and a Southbridge 134 with a network interface 118. A Northbridge 130, also known in the art as a memory controller hub (MCH), typically handles communications between the processor 102, main memory 108, graphics processor 110, and/or the Southbridge 134. In an embodiment, the Northbridge 130 may be incorporated with the processor 102. The management engine 132 may include a small processor (not shown) to run an active management technology (AMT), or similar software, to facilitate remote management of the IHS 100. As such, an administrator may manipulate the IHS from a remote location by turning on/or the IHS 100, rebooting the IHS 100, manipulating the main memory 108, the drives 114, 116, and 126, the network interface 118, the USB ports 120, the super I/O controller 122, and/or the user input devices 124, accessing and changing the basic input-output system (BIOS), and perform many other functions from a remote location as if located with the IHS 100. The network interface 118 allows the IHS 100 to communicate and transmit data over a computer network (e.g., a wired network and/or a wireless network), such as, a local area network (LAN), a wide area network (WAN) such as the Internet, and/or any other type of network.

The Southbridge 134, also known in the art as a I/O controller hub (ICH) that handles communications and the slower operations of a motherboard for the IHS 100 such as, operations/communications for, the USB ports 120, the network interface 118, the clock (not shown), a power management system (not shown), and other devices. The Southbridge 134 may be coupled to the processor 102 via the Northbridge 130. In an embodiment, the management engine 132 and the network interface 118 communicate via an interface bus 133. The Southbridge 134 may be communicatively coupled to a serial peripheral interface media (SPI) flash media device 140 via an interface bus 135. However, other types of media devices may be used instead of or in addition to the SPI flash media device 140. In an embodiment, the SPI flash media device 140 stores a boot image (e.g., an IHS boot sequence algorithm). Using an SPI flash media device 140 allows the interface bus 135 to be an SPI interface bus, which is commonly known for using a master/slave configuration where the Southbridge 134 is the master and the SPI flash media device 140 is the slave. In an embodiment, the Southbridge 134 reads the boot image from the SPI flash media device 140 and communicates the image through the Northbridge 130 to the processor 102 to start-up or otherwise boot the IHS 100. If the boot image is to be replaced or modified, a user may use the user input devices 124 to input data to the IHS 100 to modify the boot image.

Figure 3:
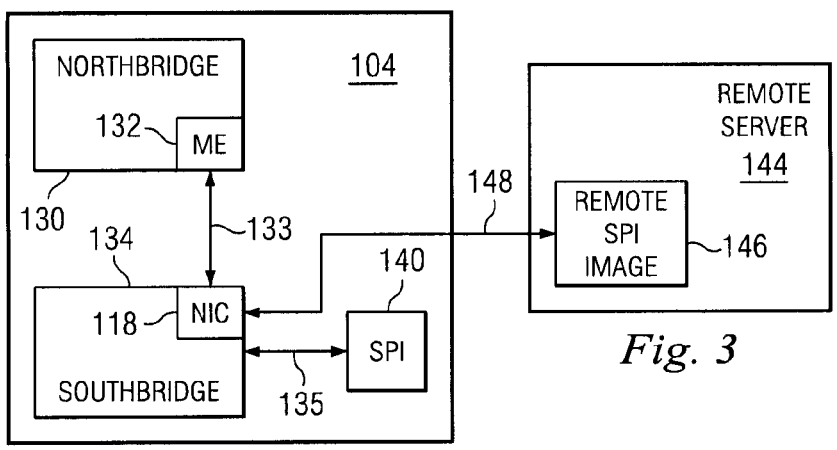
FIG. 3 illustrates a block diagram of an embodiment of a memory I/O hub coupled with a remote server.

FIG. 3 illustrates a block diagram of an embodiment of a memory I/O hub 104 coupled to a remote server 144. The remote server 144 may be an information handling system similar to the IHS 100. In an embodiment, the remote server 144 includes a remote SPI flash media device 146 storing a remote boot image. The remote boot image may be the same a the boot image stored on the SPI flash media device 140 used for booting the IHS 100 via a network connection 148. The remote boot image may be used if the boot image on the SPI flash device 140 is corrupted or otherwise cannot be used to boot the IHS 100. Additionally, the remote boot image may an updated boot image and/or another image used for a particular purpose such as, testing systems of the IHS 100. In an embodiment, the network connection 148 may be an Internet connection, a LAN connection, a telephone/radio connection, and/or any communication system allowing a technician and/or automated system to transfer the remote boot image from the remote server 144 to the IHS 100 from anywhere an Internet connection is available.

Figure 4:
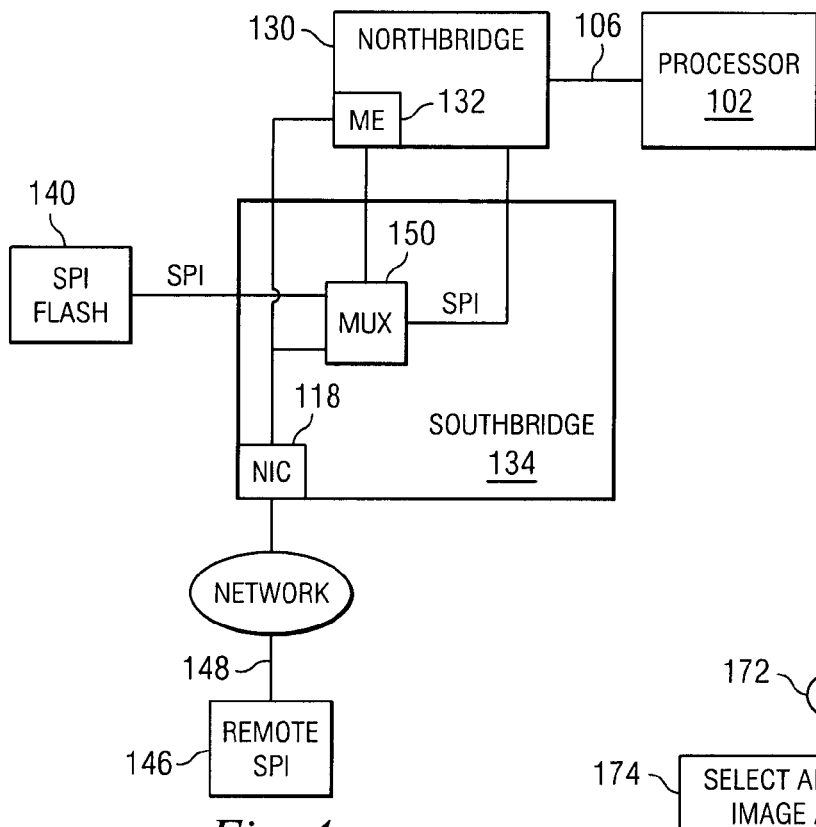
FIG. 4 illustrates a block diagram of an embodiment of a remotely bootable IHS.

FIG. 4 illustrates a block diagram of an embodiment of a remotely bootable IHS 100. In this embodiment, the IHS 106 uses a multiplexer (MUX) 150 to communicate between the Northbridge 130 and the Southbridge 134. Communication busses coupled to the MUX 150 may be SPI busses. However, other data busses may be used to communicate between components. For example, a low pin count (LPC) bus may be used instead of an SPI bus.

Figure 5:
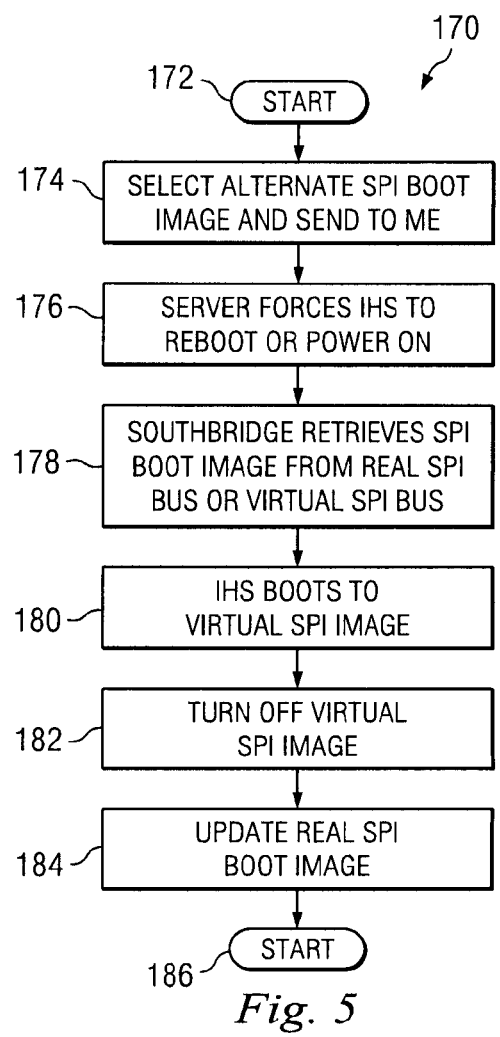
FIG. 5 illustrates a flow chart of an embodiment of a method to remotely boot an IHS.

FIG. 5 shows a flow chart of an embodiment of a method 170 to remotely boot an IHS. The method 170 starts at block 172 where a boot image is to be transferred to an IHS 100. The method 170 then proceeds to block 174 where a technician, the remote server 144, or another system selects a boot image to send to the management engine 132 of an IHS 100. The selected boot image may be sent to multiple IHSs 100 simultaneously, sequentially, or otherwise. The boot image may be sent to the management engine 132 via a LAN, the Internet, or any other type of communication network. The method 170 then proceeds to block 176 where the remote server 144 forces the IHS 100 to power on or otherwise reboot. The method 170 then proceeds to block 178 where the Southbridge 134 retrieves the boot image from a real SPI bus (e.g., from the real SPI flash media device 140 coupled to the IHS 100) or retrieves the boot image from a virtual SPI bus (e.g., from the remote (virtual) SPI flash media device 146). In an embodiment, the Southbridge 134 may receive instructions from the management engine 132 instructing whether to retrieve the boot image from the real SPI bus, or from the virtual SPI bus. In an embodiment, the method 170 may end if instructed to retrieve the real boot image (not shown). The method 170 then proceeds to block 180 where the IHS 100 performs boot operations using the retrieved virtual boot image. The method 170 then proceeds to block 182 where the IHS 100 turns off the virtual boot image. The method 170 then proceeds to block 184 where the IHS 100 updates the real boot image on the SPI flash media device 140 using the remote virtual boot image retrieved from the remote SPI media device 146 and then stops at block 186.

In an embodiment, the memory I/O hub chipset 104 may be modified from standard configurations to support ROM redirection via AMT or a similar system using integrated drive electronics (IDE), serial redirection, or other AMT implementations. In an embodiment, the AMT host (e.g., the remote server 144) may select an SPI ROM boot image file and force a remote reset on the IHS 100. The management engine 132 may determine that a host has enabled SPI redirection and would then redirect SPI accesses across the management engine 132 network via a network connection 148 to an SPI image file on the host (e.g., the remote server 144). After the IHS 100 boots from the redirected/remote SPI image, the SPI redirection may be turned off by the system BIOS so the real SPI boot image may be updated for later use. As a result of the remote BIOS image, the unexpected result of allowing remote BIOS updates and remote BIOS corruption repair is facilitated. In an embodiment, the systems and methods of the present disclosure may notify users of the IHS 100 of problems relating to the boot image for booting the IHS 100. In an embodiment, the systems and methods of the present disclosure may use two-way communications to automatically diagnose and repair problems and/or provide updates for the boot image. Any number of remote boot image boots may be used by the IHS 100. In an embodiment using the network connection 148 where the network connection 148 uses the Internet, the system may use the IP address of the IHS and/or the remote server 144 to facilitate communications between the IHS 100 and the remote server 144. The system may store the boot image on the main memory 108. The boot image may be transferred via the network connection 148 using 32 byte packets. However, other types of data packets may be used for communications. In addition, use of the remote boot image may be transparent to the processor 102.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A remote boot system, comprising:
an information handling system (IHS) including a memory input/output (I/O) hub running active management technology (AMT) software, wherein the memory I/O hub includes a management engine and a storage device; and
an AMT remote server coupled to the IHS over a network, wherein the AMT remote server is operable to:
force a remote reset of the IHS over the network;
select a serial peripheral interface (SPI) boot image file; and
enable SPI redirection on the memory I/O hub over the network; and wherein the IHS is operable to:
use the management engine, in response to the AMT remote server enabling SPI redirection, to redirect SPI accesses to the AMT remote server selected SPI boot image file over the network;
boot using the AMT remote server selected SPI boot image file;
turn off the SPI redirection; and
update a real SPI boot image on the storage device.

2. The system of claim 1, wherein the AMT remote server is further operable to:
select the SPI boot image file from a plurality of SPI boot images files.

3. The system of claim 1, wherein the AMT remote server is further operable to:
send the SPI boot image file to the management engine.

4. The system of claim 1, wherein the real SPI boot image is updated by overwriting a previous boot image.

5. The system of claim 1, wherein the forcing the remote reset of the IHS over the network includes forcing a powering on the IHS over the network.

6. The system of claim 1, wherein forcing the remote reset of the IHS over the network is performed to repair a corrupted SPI boot image.

7. The system of claim 1, wherein the forcing the remote reset of the IHS over the network includes forcing a reboot of the IHS over the network.

8. A remote boot system for a plurality of networked information handling systems (IHSs), comprising:
a plurality of IHSs, each IHS including a memory input/output (I/O) hub running active management technology (AMT) software, wherein each memory I/O hub includes a management engine and a storage device; and
an AMT remote server coupled to each of the plurality of IHSs over a network, wherein the AMT remote server is operable to:
force a remote reset of each of the plurality of IHSs over the network;
select a serial peripheral interface (SPI) boot image file;
enable SPI redirection on the memory I/O hub over the network; and wherein each of the plurality of IHSs is operable to:
use a respective management engine, in response to the AMT remote server enabling SPI redirection, to redirect SPI accesses to the AMT remote server selected SPI boot image file over the network
boot using the AMT remote server selected SPI boot image file;
turn off the SPI redirection; and
update a real SPI boot image on a respective storage device.

9. The IHS of claim 8, wherein the AMT remote server is further operable to:
select the SPI boot image file from a plurality of SPI boot images files.

10. The IHS of claim 8, wherein the AMT remote server is further operable to:
send the SPI boot image file to the management engine.

11. The IHS of claim 8, wherein the real SPI boot image is updated by overwriting a previous boot image.

12. The IHS of claim 8, wherein the forcing the remote reset of the plurality of IHSs over the network includes forcing a powering on of the plurality of IHSs over the network.

13. The IHS of claim 8, wherein forcing the remote reset of the plurality of IHSs over the network is performed to repair a corrupted SPI boot image.

14. The IHS of claim 8, wherein the forcing the remote reset of the plurality of IHSs over the network includes forcing a reboot of the plurality of IHSs over the network.

15. A method to remotely boot an information handling system (IHS), the method comprising:
providing the IHS including a memory input/output (I/O) hub running active management technology (AMT) software, wherein the memory I/O hub includes a management engine and a storage device
forcing a remote reset of the IHS over a network using an AMT remote server;
selecting a serial peripheral interface (SPI) boot image file using the AMT remote server:
enabling SPI redirection on the memory I/O hub over the network using the AMT remote server and, in response, redirecting SPI accesses to the AMT remote server selected SPI boot imagine file over the network using the management engine
booting using the AMT selected SPI boot image file;
turning off the SPI redirection; and
updating a real SPI boot image on the storage device.

16. The method of claim 15, further comprising:
selecting the SPI boot image file from a plurality of SPI boot image files.

17. The method of claim 16, further comprising:
sending the SPI boot image file to the management engine.

18. The method of claim 15, wherein the real SPI boot image is updated by overwriting a previous boot image.

19. The method of claim 15, wherein the forcing the remote reset of the ISH over the network includes forcing a reboot of the IHS over the network.

20. The method of claim 15, wherein forcing the remote reset of the IHS over the network is performed to repair a corrupted SPI boot image.

* * * * *